May 17, 1949. H. B. SCHULTZ 2,470,746
VALVE
Filed Oct. 8, 1945
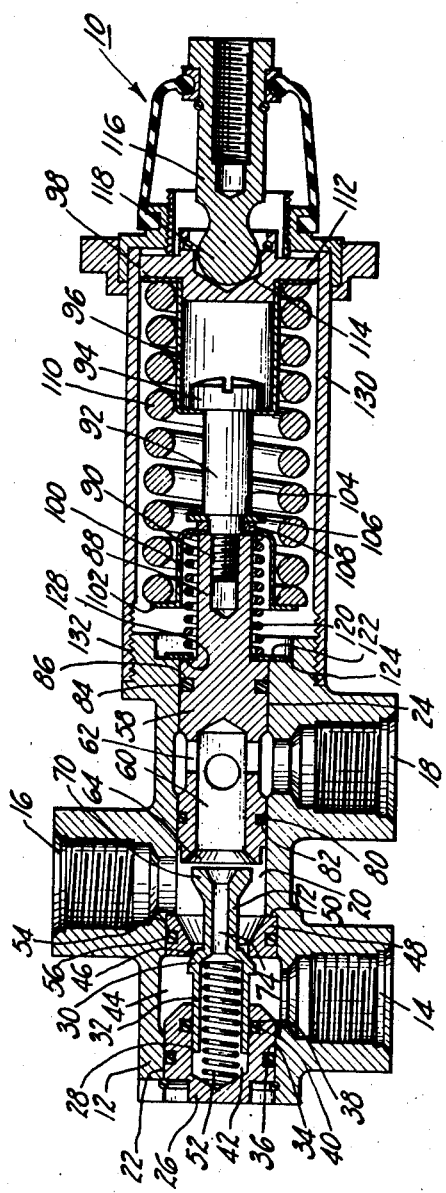
INVENTOR.
HAROLD B. SCHULTZ
BY
Cecil J Arens Patented May 17, 1949

2,470,746

UNITED STATES PATENT OFFICE 2,470,746

VALVE

Harold B. Schultz, South Bend, Ind., assignor to Bendix Aviation Corporation, South Bend, Ind., a corporation of Delaware Application October 8, 1945, Serial No. 621,095

5 Claims. (Cl. 303—54)

This invention relates to valves and more particularly to hydraulically balanced valves.

It has been found that for certain hydraulic applications it is highly desirable that the valves used be not affected by pressure changes in cavities surrounding the movable parts of the valve.

It is therefore a principal object of this invention to provide a hydraulically balanced valve for use in a fluid pressure system.

Another object of the invention resides in the provision of a fluid valve the control member of which is constructed and arranged to be hydraulically balanced under all conditions of valve operation.

A further important object of the invention resides in the provision of a hydraulically balanced poppet valve for use in a reaction type valve, which enables the reaction to be varied without affecting the fluid flow through the valve.

Other objects and advantages reside in certain novel features of the construction, arrangement, and combination of parts which will be hereinafter more fully described and particularly pointed out in the subjoined claims, reference being had to the accompanying drawing forming a part of this specification, in which:

The single figure shows a longitudinal sectional view of a valve incorporating the novel features of the invention.

Referring to the figure, the reference numeral 10 indicates a valve for use in a power braking system, not shown. The valve comprises a body 12 having inlet, working and return ports 14, 16 and 18, respectively. Located within the valve body is a stepped bore 20 having a large diameter 22 and a small diameter 24, which intersects the ports to establish communication therebetween. A plug or guide member 26, located in the large diameter 22 of the bore, is drilled at 28 to provide a sliding fit as well as a bearing for a poppet valve 30 which has a sleeve portion 32 slidably disposed within the drilled opening 28. The plug or guide member 26, which may be held in position within the bore in any suitable manner such as shown, is equipped with an exteriorly located circumferential groove 34 to receive a seal 36 which seals this end of the bore from atmosphere. The drilled opening 28 of the plug 26, is interiorly grooved at 38 to accommodate a seal 40 which divides the large diameter 22 and the drilled opening 28 into two chambers 42 and 44, the latter of which is subjected to inlet port pressure and the former of which is subjected to return port pressure.

Located in the bore 20, between the inlet port 14 and the ports 16 and 18, is a valve seat 46 formed in a ring-like member 48, which abuts a reduced portion 50, formed at the junction of the diameters 22 and 24. A spring 52, disposed within the sleeve portion 32, has one end abutting the plug 26 and its other end, or free end, engaging the poppet valve 30 for urging said valve against the seat 46 to cut off communication between the inlet port 14 and the ports 16 and 18. The ring-like member 48 has an exterior groove 54 therein which cooperates with a seal 56 to seal the inlet 14 and chamber 44 from the working and return ports 16 and 18. A spindle or piston 58, drilled longitudinally at 60 and radially at 62, is slidably located in the small diameter 24 of the bore. The drilled opening 60 is countersunk at 64 to provide a valve seat for a valve head 70 integral with the poppet valve 30 and rigidly connected thereto by a reduced shank portion 72, drilled at 74 to form a continuous passage, which communicates the chamber 42 with both the working and return ports simultaneously, or with the return port only depending on whether the valve seat 64 is in the position shown in the drawing or urged against the valve head 70. A seal 80 circumscribes the piston 58 and is contained in a groove 82 to seal the inlet pressure from the return port when the poppet valve 30 is unseated. A seal 84 is positioned in a groove 86 of the piston to seal the small diameter bore from atmosphere. The end of the spindle or piston 58 opposite from the valve seat 64 has a reduced portion 88 drilled and threaded at 90 for the reception of a bolt stud 92 having an enlarged head 94 engaging a cup-like member 96 flanged at 98. A second cup-like member 100 is carried by the reduced portion 88 of the spindle 58. The second cup-like member 100, which has a flange portion 102, is secured to the spindle by the bolt stud 92, which has a shoulder 104 engaging a washer 106 which presses against a second washer 108.

A heavy spring 110 has one of its ends engaging the flange 98 of the cup-like member 96 and its other end engaging the flange 102 of cup-like member 100 to thereby urge cup 96, which is freely movable along the stem of bolt stud 92, against the bolt head 94. The valve operating force necessary for moving the spindle against the valve head 70 to unseat poppet 30 is transmitted through the heavy spring 110. A member 112 rides on the flange 98 of cup 96 and is counterbored at 114 to provide a socket for a push rod 116 rounded at 118 to cooperate with the socket. The push rod is connected by any suitable linkage, not shown, to a lever, not shown, which is operator operated.

A light spring 120 has one of its ends abutting a washer-like element 122 which rests in a counterbore 124 of body 12 and its other end, or free end, engaging the inner side of cup 100 tending to urge the spindle 58 to the right to unseat valve seat 64 from valve head 70 to thereby establish communication between working port 16 and return port 18. The washer-like element 122 has a portion overlapping the small diameter 24 of bore 20 so as to engage a shoulder 128 formed on spindle 58. This arrangement normally positions the piston in the bore.

A sleeve 130 threadedly engages the body 12 at 132 to form a housing for the springs 110 and 120, and to provide a guide for member 112 which slides within the housing.

In order to hydraulically balance the poppet valve 30 against the pressure in chamber 44 acting thereon when the poppet valve is seated, the diameter of seat 46 on which poppet 30 seats is made equal to the diameter of the drilled opening 28 in which the sleeve portion 32 slides. So that the valve head 70 will be hydraulically balanced against the pressure existing in the small diameter 24 of bore 20, the diameter of valve head 70 is made equal to the diameter of the drilled opening 28 in which sleeve 32 slides. The passage formed by the drilled portion 74 communicates the small diameter 24 of bore 20 with the chamber 42. Hence with the poppet on its seat as shown in the figure it is hydraulically balanced, being urged toward seat 46 by the force only of spring 52. The diameters of valve head 70, valve seat 46, and the drilled opening 28 are of the same size.

With the poppet valve 30 unseated, in response to movement of the spindle 58 to the left, and the valve head 70 seated at 64, inlet pressure acts on the exterior of the poppet valve between seat 64 and the drilled opening 28 into which sleeve 32 slides. Since the diameter of the valve head 70 is the same as the diameter of the drilled opening 28, the valve is hydraulically balanced against inlet pressure when in this position. When the valve head 70 is in the last-mentioned position chamber 42 is connected to return port pressure. Here again, since the diameter of the valve head 70 is the same as the diameter of the drilled opening 28, the interior of the poppet valve, which is connected to the return port pressure through the passage, comprising drilled portion 74 is hydraulically balanced against the return port pressure. When this novel invention is incorporated into a valve of the reaction type there is the advantage that the reaction of the valve may be varied at will without affecting the flow through the valve. In the present embodiment the reaction of the valve is determined by the difference between the diameter of the valve head 70 and the diameter of the piston 58.

While I have shown and described one construction in which the invention may be advantageously embodied, it is to be understood that the construction shown has been selected merely for the purpose of illustration and example, and that various changes in the size, shape and arrangement of the parts may be made without departing from the spirit of the invention or the scope of the appended claims.

I claim:
1. A valve for use in a fluid pressure system comprising a valve body, inlet, working and return ports in the body, means communicating the ports with one another, a poppet valve in the body subjected to inlet port pressure, means in the body having an opening therein to slidably receive one end of the poppet valve to provide a guide therefor, said one end of the poppet valve constituted to be sealed from the inlet port pressure, means normally urging the poppet valve toward its seat to cut off communication between the inlet port and the other two ports, valve means in the body including a valve head carried by the other end of the poppet valve and a valve seat movable with respect to the valve head for controlling communication between the working and return ports and normally arranged to establish communication between the working and return ports, a longitudinal passage extending through the poppet valve and valve head, and means for operating the valve means and the poppet valve to urge the latter in a direction away from its seat to establish communication between the inlet and the working port and to urge the former in a direction to cut off communication between the working and return ports, said poppet valve seat, opening, and valve head, having equal diameters so constituted as to provide equal effective areas subject to inlet, return and working port pressures, whereby a hydraulically balanced poppet valve is obtained irrespective of the position of said poppet valve.

2. A valve for use in a fluid pressure system comprising a valve body having a bore therein, inlet, working and return ports in the body communicating with the bore, a poppet valve in one end of the bore subjected to inlet port pressure and normally spring urged toward its seat to cut off communication between the inlet port and the other two ports, means in one end of the bore having an opening therein to slidably receive one end of the poppet valve to provide a guide therefor, said one end of the poppet valve constituted to be sealed from the inlet port pressure, a valve head integral with the other end of said poppet valve, means for equalizing the pressures acting on the ends of the poppet valve, a member slidable in the other end of said bore and constructed and arranged to cooperate with the valve head to control communication between the working and return ports, said member being movable away from said valve head for establishing communication between the working and return ports, and means for moving said member to control communication between the working and return ports and for moving said poppet valve in a direction tending to unseat the same against the force of the spring, said poppet valve seat, opening, and valve head, having equal diameters so constituted as to provide equal effective areas subject to inlet, return and working port pressures whereby a hydraulically balanced poppet valve is obtained irrespective of the position of said poppet valve.

3. A valve for use in a fluid pressure system comprising a valve body having a bore therein, inlet, working and return ports in the body communicating with the bore, a poppet valve in one end of the bore subjected to inlet port pressure and normally spring urged toward its seat to cut off communication between the inlet port and the other two ports, means in one end of the bore having an opening therein to slidably receive one end of the poppet valve to provide a guide therefor, said one end of the poppet valve constituted to be sealed from the inlet port pressure, a valve head integral with the other end of said poppet valve, means for equalizing the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being movable in a direction tending to disengage the valve seat from the valve head, and means for moving said valve seat to engage the valve head and to unseat said poppet valve, said poppet valve seat, opening, and valve head, having equal diameters so constituted as to provide equal effective areas subject to inlet, return and working port pressures, whereby a hydraulically balanced poppet valve is obtained irrespective of the position of said poppet valve.

4. A valve for use in a fluid pressure system comprising a valve body having a bore therein, inlet, working and return ports in the body communicating with the bore, a poppet valve normally spring urged toward its seat to cut off communication between the inlet port and the other two ports, a closure member for one end of the bore constructed and arranged to slidably receive the poppet valve to provide a bearing therefor and at the same time seal one end of the poppet valve from the inlet port pressure, the diameters of the poppet valve seat and the bearing in the closure member being of the same dimension to thereby hydraulically balance the poppet valve against inlet port pressure when the valve is in cut-off position, a valve head integral with said poppet valve and located on the outlet side of the valve seat, a longitudinal passage extending through the poppet valve and valve head to thereby equalize the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being movable in a direction tending to disengage the valve seat from the valve head, and means for moving said valve seat to engage the valve head and to unseat said poppet valve.

5. A valve for use in a fluid pressure system comprising a valve body having a bore therein, inlet, working and return ports in the body communicating with the bore, a poppet valve normally spring urged toward its seat to cut off communication between the inlet port and the other two ports, a closure member for one end of the bore constructed and arranged to slidably receive the poppet valve to provide a bearing therefor and at the same time seal one end of the poppet valve from the inlet port pressure, the diameters of the poppet valve seat and the bearing in the closure member being of the same dimension to thereby hydraulically balance the poppet valve against inlet port pressure when the valve is in cut-off position, a valve head integral with said poppet valve and located on the outlet side of the valve seat, a longitudinal passage extending through the poppet valve and valve head to thereby equalize the pressures acting on the ends of the poppet valve, a member slidable in the other end of said bore and having intersecting longitudinal and radial bores therein which communicate the return port with the working port to provide communication therebetween, said member having a valve seat formed in the longitudinal bore for engagement with the valve head to control communication between the working and return ports, said member being normally spring urged in a direction tending to move the valve seat away from the valve head, and means for moving said valve seat to engage the valve head and to unseat said poppet valve, the diameter of the valve seat for the valve head and the diameter of the bearing in the closure member being of the same size so that the poppet valve will be hydraulically balanced against inlet and return port pressures when the poppet valve is unseated and the valve head is seated.

HAROLD B. SCHULTZ.

REFERENCES CITED

The following references are of record in the file of this patent:

UNITED STATES PATENTS

| Number | Name | Date |
|---|---|---|
| 1,598,798 | Aikman | Sept. 7, 1926 |
| 1,814,565 | Lombard | July 14, 1931 |
| 2,040,590 | Avery | May 12, 1936 |

Disclaimer 2,470,746.—*Harold B. Schultz*, South Bend, Ind. VALVE. Patent dated May 17, 1949. Disclaimer filed Dec. 19, 1949, by the assignee, *Bendix Aviation Corporation*.
Hereby enters this disclaimer to claims 1 to 5 of said patent.
[*Official Gazette January 17, 1950.*]